(12) United States Patent
Ide

(10) Patent No.: US 8,335,030 B2
(45) Date of Patent: Dec. 18, 2012

(54) LIGHT CONTROLLING APPARATUS, CONTROL UNIT OF LIGHT CONTROLLING APPARATUS, AND METHOD OF DRIVING LIGHT CONTROLLING APPARATUS

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 164 days.

(21) Appl. No.: 12/534,688

(22) Filed: Aug. 3, 2009

(65) Prior Publication Data

US 2010/0027094 A1 Feb. 4, 2010

(30) Foreign Application Priority Data

Aug. 1, 2008 (JP) ................................. 2008-199377

(51) Int. Cl.
*G02B 26/02* (2006.01)
(52) U.S. Cl. ..................................................... 359/233
(58) Field of Classification Search .................. 359/227, 359/230, 232–236
See application file for complete search history.

(56) References Cited

U.S. PATENT DOCUMENTS

| | | | | |
|---|---|---|---|---|
| 3,277,772 | A * | 10/1966 | Atwood | 359/210.1 |
| 5,706,128 | A * | 1/1998 | Greenberg | 359/385 |
| 6,473,217 | B2 * | 10/2002 | Imano | 359/227 |

FOREIGN PATENT DOCUMENTS

JP 2006-330314 12/2006

* cited by examiner

*Primary Examiner* — Jennifer L. Doak
(74) *Attorney, Agent, or Firm* — Scully, Scott, Murphy & Presser, P.C.

(57) ABSTRACT

A method of driving light controlling apparatus which includes a substrate, which has an aperture, a plurality of incident-light controlling unit which are displaced on the substrate, a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position, and in which, the incident-light controlling unit is displaced by the driving unit to the aperture position and the retracted position alternately, and incident light passing through the aperture is adjusted, and the displacement of each incident-light controlling unit to the aperture position is exclusive for the other incident-light controlling unit, includes a step of displacing the incident-light controlling unit, which includes a step of displacing a first incident-light controlling unit disposed at the aperture position, to the retracted position, and a step of displacing a second incident-light controlling unit disposed at the retracted position, to the aperture position, after completion of the step of displacing the first incident-light controlling unit to the retracted position.

22 Claims, 14 Drawing Sheets

LIGHT CONTROLLING APPARATUS, CONTROL UNIT OF LIGHT CONTROLLING APPARATUS, AND METHOD OF DRIVING LIGHT CONTROLLING APPARATUS

CROSS-REFERENCE TO RELATED APPLICATION

The present application is based upon and claims the benefit of priority from the prior Japanese Patent Application No. 2008-199377 filed on Aug. 1, 2008; the entire contents of which are incorporated herein by reference.

BACKGROUND OF THE INVENTION

1. Field of the Invention

The present invention relates to a light controlling apparatus, a control unit of the light controlling apparatus, and a method of driving the light controlling apparatus.

2. Description of the Related Art

A variety of types have hitherto been implemented as a light controlling apparatus, and as one of the methods, a plug-in type light controlling apparatus in which, a single or a plurality of optical elements is displaced mutually inside and outside an optical path, by an electromagnet or a drive source other than the electromagnet, and optical characteristics of incident light which passes through the optical path are changed, is available. In this plug-in type light controlling apparatus, by forming a plurality of optical elements, it is possible to extend functions thereof. Furthermore, with achievement of high image quality of a small-size image pickup equipment such as a portable equipment and a micro videoscope having an image pickup function in recent years, regarding optical elements such as a lens, a diaphragm, and an optical filter, a focus lens, a variable diaphragm, and a variable characteristics filter have been increasingly sought to be used rather than the conventional fixed focus lens, fixed diaphragm, and fixed characteristics filter. As a light controlling apparatus which is appropriate for such small-size image pickup equipment, the abovementioned plug-in type light controlling apparatus, because of a simple structure, has been drawing attention as a light controlling apparatus which is appropriate for making the size small. As an example of such plug-in type light controlling apparatus which is appropriate for making the size small, in Japanese Patent Application Laid-open Publication No. 2006-330314, a light controlling apparatus which includes a plurality of light shielding members which control an amount of light, a plurality of driving means which drive the plurality of light shielding members respectively by acquiring an electromagnetic driving force, and a base member on which, the plurality of light shielding members and the plurality of driving means are installed, and in which, the small-sizing and stable drive of the apparatus are realized by providing an inhibiting member which inhibits an inflow of leakage flux into an intermediate portion of the plurality of driving means has been disclosed.

However, in a case of driving stably the plurality of optical elements (the light shielding members in Japanese Patent Application Laid-open Publication No. 2006-330314), a point that as to how to drive each optical element in coordination while facilitating stability by a structure of the light controlling apparatus becomes significant. This is because, since each optical element is in contact with the other optical element, or there is a possibility that each optical element makes a contact with the other optical element, or an operation of one optical element has an effect on the other optical element, or interferes with the other optical element, and due to the effector the interference between these optical elements, an operation of the light controlling apparatus might become unstable. Regarding this point, in Japanese Patent Application Laid-open Publication No. 2006-330314, an operation of each light shielding member has not been mentioned in detail.

SUMMARY OF THE INVENTION

The present invention is made in view of the abovementioned circumstances, and an object of the present invention is to provide a light controlling apparatus including a plurality of optical elements, and in which, it is possible to prevent an operation of the light controlling apparatus from becoming unstable due to the mutual effect or interference between the optical elements.

To solve the abovementioned issues and to achieve the object, according to a first aspect of the present invention, there is provided a method of driving light controlling apparatus which includes a substrate, which has an aperture, a plurality of incident-light controlling unit which are displaced on the substrate, a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position, the incident-light controlling unit is displaced by the driving unit to the aperture position and the retracted position alternately, and incident light passing through the aperture is adjusted, and the displacement of each incident-light controlling unit to the aperture position is exclusive for the other incident-light controlling unit, including a step of displacing the incident-light controlling unit, which includes a step of displacing a first incident-light controlling unit disposed at the aperture position, to the retracted position, and a step of displacing a second incident-light controlling unit disposed at the retracted position, to the aperture position, after completion of the step of displacing the first incident-light controlling unit to the retracted position.

It is preferable that the method of driving light controlling apparatus according to the present invention further includes a step of releasing the retracting-displacement driving force of the driving units corresponding to all the incident-light controlling unit disposed at the retracted position, after completion of the step of displacing the second incident-light controlling unit disposed at the retracted position, to the aperture position.

The method of driving light controlling apparatus according to the present invention may further include a step of exerting the retracting-displacement driving force of the driving units corresponding to all incident-light controlling unit disposed at the retracted position prior to the step of displacing the first incident-light controlling unit disposed at the aperture position to the retracted position.

The method of driving light controlling unit according to the present invention can further include a step of reducing the aperture-displacing driving force of the driving unit corresponding to the incident-light controlling unit disposed at the aperture position after the step of displacing the second incident-light controlling unit disposed at the retracted position, to the aperture position.

In the method of driving light controlling apparatus according to the present invention, it is preferable that the aperture-displacing driving force and the retracting-displacement driving force include an operating driving force which displaces the position of the incident-light controlling unit and a maintaining driving force which maintains the position of the incident-light controlling unit, and that the operating driving force is stronger than the maintaining driving force.

In the method of driving light controlling apparatus according to the present invention, it is preferable that the operating driving force is in a form of a sinusoidal wave.

In the method of driving light controlling apparatus according to the present invention, the maintaining driving force can be exerted intermittently to the incident-light controlling unit.

In the method of driving light controlling apparatus according to the present invention, the plurality of incident-light controlling unit may be displaced in a same plane.

In the method of driving light controlling apparatus according to the present invention, it is preferable that each of the plurality of incident-light controlling unit is displaced in a different plane, and that a regulating member which regulates the displacement of the other incident-light controlling unit to the aperture position is formed in each incident-light controlling unit.

In the method of driving light controlling apparatus according to the present invention, at the time of putting ON a power supply of the light controlling apparatus, all the incident-light controlling unit can be displaced to the retracted position.

In the method of driving light controlling apparatus according to the present invention, it is practical that an aperture of a different diameter is formed in each incident-light controlling unit.

In the method of driving light controlling apparatus according to the present invention, a different optical lens may be formed for each incident-light controlling unit.

In the method of driving light controlling apparatus according to the present invention, it is preferable that a different optical filter is formed for each incident-light controlling unit.

According to a second aspect of the present invention a control unit of light controlling apparatus according to the present invention, which drives a light controlling apparatus, generates the aperture-displacing driving force and the retracting-displacement driving force, and exerts the aperture-displacing driving force and the retracting-displacement driving force to the incident-light controlling unit.

A light controlling apparatus according to the present invention includes a substrate, which has an aperture, a plurality of incident-light controlling unit which are disposed on the substrate, a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position, and a detecting section which detects a state of the incident-light controlling unit, and based on a result of detection by the detecting section, the incident-light controlling unit is displaced by the driving unit to the aperture position and the retracted position alternately, and incident light passing through the aperture is adjusted, and the displacement of each incident-light controlling unit to the aperture position is exclusive for the other incident-light controlling unit.

In the light controlling apparatus according to the present invention, it is preferable that an aperture of different diameter is formed in each incident-light controlling unit.

In the light controlling apparatus according to the present invention, a different optical lens may be formed for each incident-light controlling unit.

In the light controlling apparatus according to the present invention, a different optical filter can be formed for each incident-light controlling unit.

DETAILED DESCRIPTION OF THE INVENTION

Exemplary embodiment of a light controlling apparatus, a control unit of light controlling apparatus, and a method of driving light controlling apparatus according to the present invention will be described below in detail by referring to the accompanying diagrams. However, the present invention is not restricted to the embodiments described below.

First Embodiment

Figure 1:
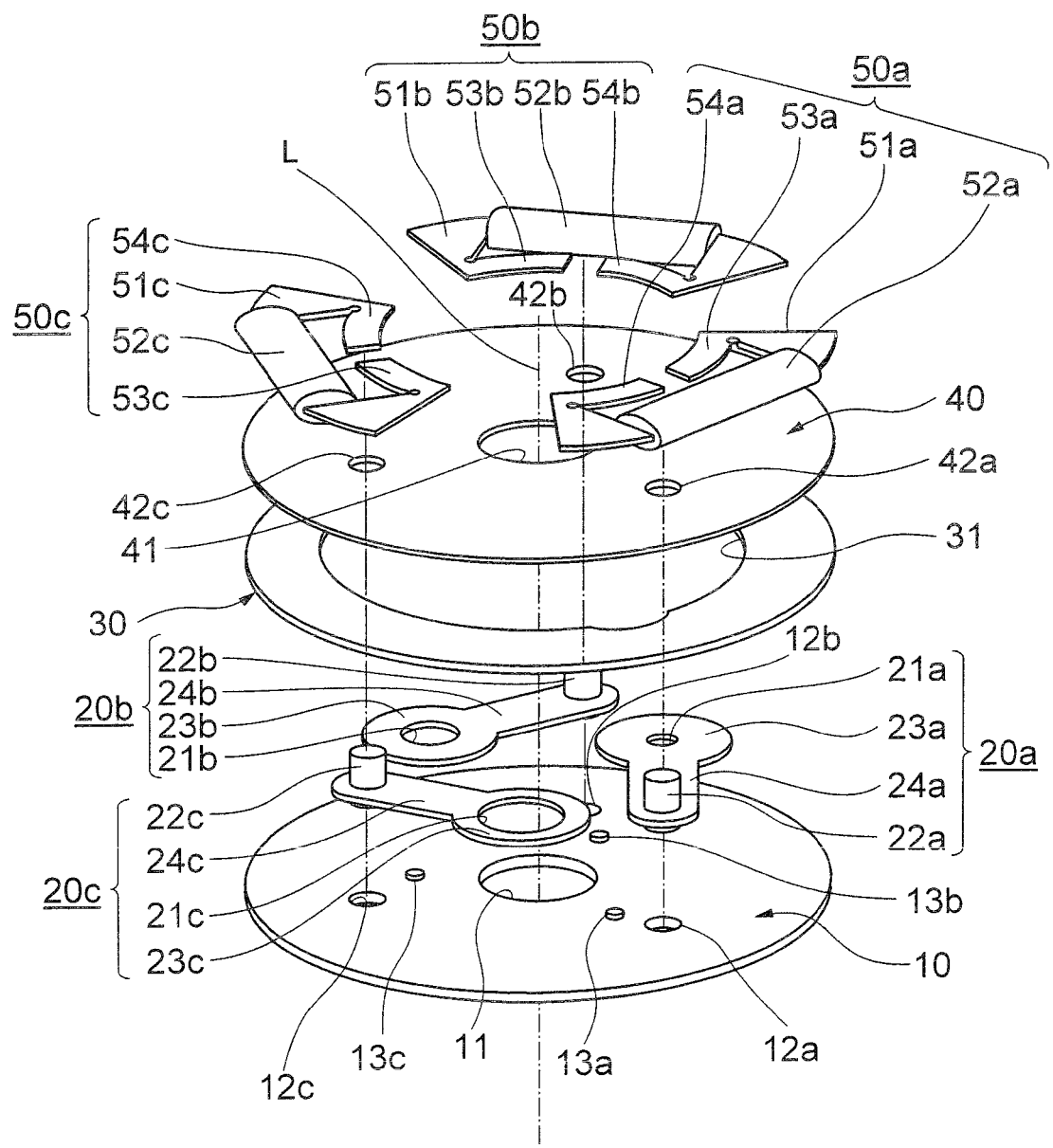
FIG. 1 is an exploded perspective view showing a structure of a multiple-stage variable diaphragm according to a first embodiment of the present invention.

A light controlling apparatus according to a first embodiment is a multiple-stage variable diaphragm 100 in which, a plurality of diaphragm plates having different aperture diameter is formed, and which regulates in stages, an amount of light passing through an aperture by displacing each diaphragm plate to an optical-path position and outside the optical path. A structure of the multiple-stage variable diaphragm 100 (light controlling apparatus) according to the first embodiment will be described below by referring to FIG. 1. FIG. 1 is an exploded perspective view showing the structure of the multiple-stage variable diaphragm 100 according to the first embodiment.

As shown in FIG. 1, the multiple-stage variable diaphragm 100 according to the first embodiment includes a lower substrate 10 (base plate), a plurality of diaphragm plates 20a, 20b, and 20c (incident-light controlling means), a spacer 30, an upper substrate 40 (base plate), and a plurality of coils 50a, 50b, and 50c (driving means).

A first aperture 11, a plurality of bearing holes 12a, 12b, and 12c, and a plurality of positioning protrusions 13a, 13b, and 13c are formed in the lower substrate 10. Apertures 21a, 21b, and 21c having mutually different diameter, and shaft members 22a, 22b, and 22c are formed in and on the plurality of diaphragm plates 20a, 20b, and 20c respectively. An opening portion 31 is formed in the spacer 30. A second aperture 41 and a plurality of bearing holes 42a, 42b, and 42c are formed in the upper substrate 40. In the plurality of coils 50a, 50b, and 50c, coil wires 52a, 52b, and 52c are wound around cores 51a, 51b, and 51c respectively.

Each component will be described below in detail.

The lower substrate 10 and the upper substrate 40 are disposed such that a center of a circular-shaped opening of the first aperture 11 of the lower substrate 10 and a center of a circular-shaped opening of the second aperture 41 of the upper substrate 40 coincide with an optical axis L, and an optical path is such that incident light passes through the optical path. An aperture diameter of the first aperture 11 and the second aperture 41 is formed to be same or different, and a smaller aperture diameter becomes the maximum aperture diameter in the multiple-stage variable diaphragm 100.

The spacer 30 is disposed between the lower substrate 10 and the upper substrate 40, and regulates a distance between the lower substrate 10 and the upper substrate 40.

The diaphragm plates 20a, 20b, and 20c have a thickness less than a thickness of the spacer 30, and include light shielding portions 23a, 23b, and 23c, and arm portions 24a, 24b, and 24c respectively. Apertures 21a, 21b, and 21c smaller than the first aperture 11 formed in the lower substrate 10 and the second aperture 41 formed in the upper substrate 40 are formed in the light shielding portions 23a, 23b, and 23c respectively. Moreover, the shaft members 22a, 22b, and 22c made of a circular cylindrical shaped magnet are press fitted into the arm portions 24a, 24b, and 24c respectively. The shaft members 22a, 22b, and 22c are press fitted into the arm portions 24a, 24b, and 24c respectively, to protrude upward from an upper surface of the arm portions 24a, 24b, and 24c, and to protrude downward from a lower surface of the arm portions 24a, 24b, and 24c. Moreover, the shaft members 22a, 22b, and 22c are magnetized to have S polarity and N polarity with respect to a radial direction.

The shaft members 22a, 22b, and 22c are inserted into the bearing holes 12a, 12b, and 12c respectively, formed in the lower substrate 10, and are also inserted into the bearing holes 42a, 42b, and 42c respectively, formed in the upper substrate 40. Accordingly, the diaphragm plates 20a, 20b, and 20c are rotatable with the shaft members 22a, 22b, and 22c as axis of rotation respectively. The diaphragm plates 20a, 20b, and 20c with different diameter of the apertures 21a, 21b, and 21c respectively, are formed at three locations in a same plane, perpendicular to the optical axis L with a center of the first aperture 11 and the second aperture 41 as an axis.

The coils 50a, 50b, and 50c have the coil wires 52a, 52b, and 52c wound around the cores 51a, 51b, and 51c respectively. Both ends of the cores 51a, 51b, and 51c are disposed such that, front ends thereof are facing mutually leaving a predetermined space in between, and form coil arm portions 53a, 53b, and 53c, and coil arm portions 54a, 54b, and 54c respectively. The coil arm portions 53a, 53b, and 53c and the coil arm portions 54a, 54b, and 54c are joined to the upper substrate 40 such that, the shaft members 22a, 22b, and 22c are sandwiched in the predetermined space formed thereby. Due to an electric current flowing through the coil wires 52a, 52b, and 52c of the coils 50a, 50b, and 50c, the coil arm portions 53a, 53b, and 53c, and the coil arm portions 54a, 54b, and 54c are magnetized mutually to the S polarity and N polarity respectively.

Figure 2:
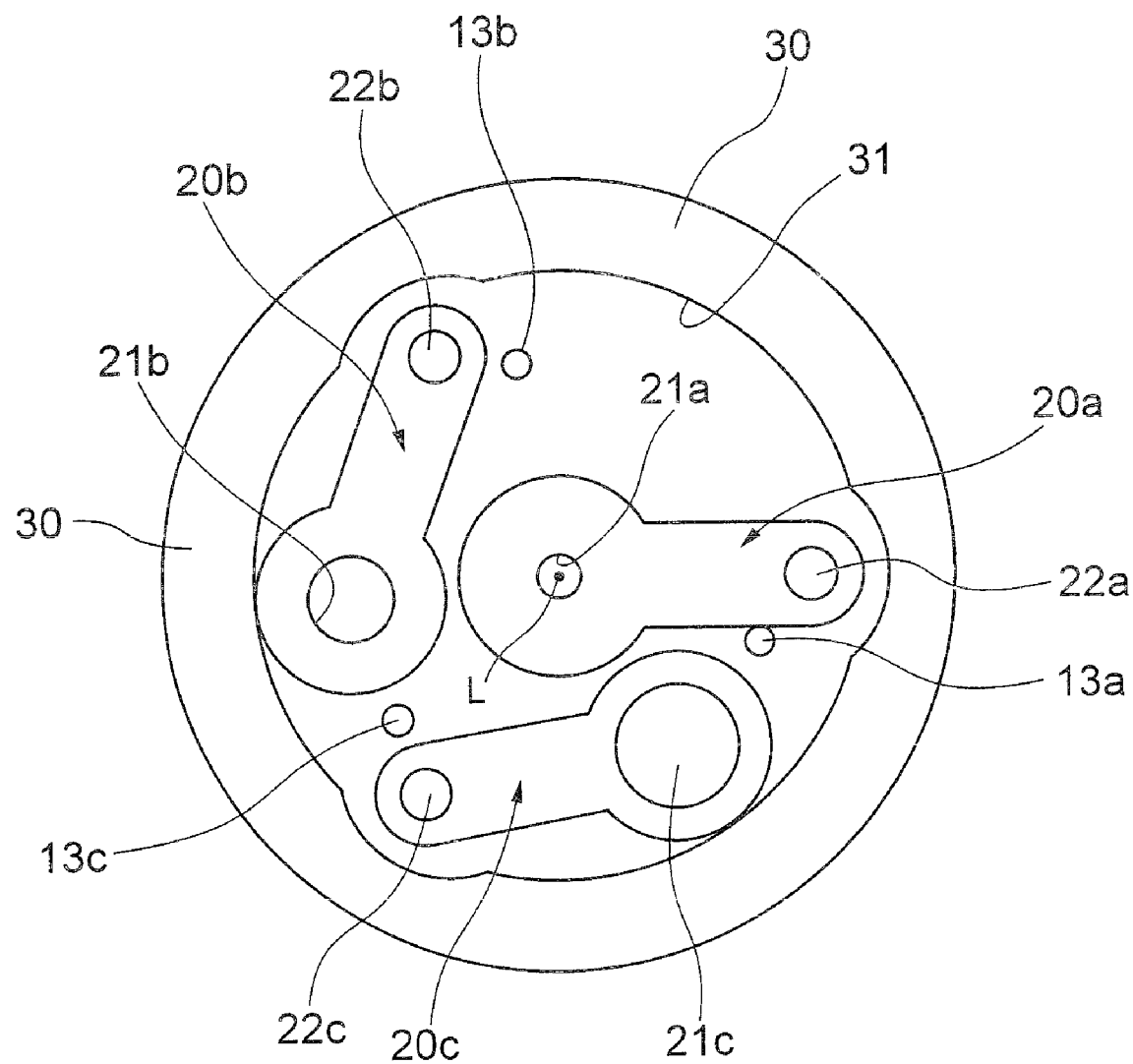
FIG. 2 is a plan view showing an example in which, a torque in a direction toward one position of an aperture is applied to one of a plurality of diaphragm plates according to the first embodiment, and a torque in a direction toward a retracted position is applied to the remaining diaphragm plates according to the first embodiment.

Next, an operation of the multiple-stage variable diaphragm 100 according to the first embodiment will be described below while referring to FIG. 2. Here, FIG. 2 is plan view showing an example in which, a torque in a direction toward one position of an aperture is applied to the diaphragm plate 20a, and a torque in a direction toward a retracted position is applied to the diaphragm plates 20b and 20c. The coils 50a, 50b, 50c, and the upper substrate 40 are not shown in FIG. 2, and similarly are not shown in the rest of the diagrams.

In the multiple-stage variable diaphragm 100, due to magnetic attraction and magnetic repulsion between the magnetic polarity of the shaft members 22a, 22b, and 22c, and the magnetic polarity of the coil arm portions 53a, 53b, and 53c, and the coil arm portions 54a, 54b, and 54c which is generated due to the coils 50a, 50b, and 50c, a torque is generated in the shaft members 22a, 22b, and 22c, and the diaphragm plates 20a, 20b, and 20c rotate with the shaft members 22a, 22b, and 22c as a center of rotation. It is possible to control a direction of rotation by controlling a direction of the electric current flowing through the coil wires 52a, 52b, and 52c.

In the example shown in FIG. 2, the diaphragm plate 20b and the diaphragm plate 20c rotate in a clockwise direction in the diagram, and stop in a state of being abut to an inner wall of the opening portion 31 of the spacer 30. Hereinafter, this position will be called as a 'retracted position'. On the other hand, the diaphragm plate 20a rotates in a counterclockwise direction in the diagram, and stops in a state of being abut to the positioning protrusion 13a. Hereinafter, this position will be called as an 'aperture position'. In this state, the aperture 21a of the diaphragm plate 20a is inserted at a position of the first aperture 11 formed in the lower substrate 10 and the second aperture 41 formed in the upper substrate 40, and the aperture 21a formed in the diaphragm plate 20a becomes a diameter of an optical path through which the incident light passes. Here, a shape of the diaphragm plates 20a, 20b, and 20c, and a position of forming of the positioning protrusion 13a is set such that a center of the aperture 21a coincides with the optical axis L.

Similarly as the example shown in FIG. 2, it is possible to rotate the diaphragm plate 20b or the diaphragm plate 20c, till abutting with the positioning protrusion 13b or the positioning protrusion 13c, and insert in the aperture position, and to let the apertures 21b or 21c formed in the diaphragm plate 20b or the diaphragm plate 20c to be the diameter of the optical path through which the incident light passes. The shape of the diaphragm plates 20b and 20c, and a position of forming of the positioning protrusions 13b and 13c is set such that a center of the apertures 21b and 21c coincides with the optical axis L. Without providing the positioning protrusions 12a, 13b, and 13c, it is also possible to dispose the diaphragm plates at the aperture position by bringing in contact with the diaphragm plate which is at a position other than the retracted position.

When the diaphragm plates 20a, 20b, and 20c are disposed at the retracted position by imparting torque in the clockwise direction in the diagram to the diaphragm plates 20a, 20b, and 20c, smaller one of the first aperture 11 formed in the lower substrate 10 and the second aperture 41 in the upper substrate 40 becomes the diameter of the optical path through which the incident light passes. Consequently, it is possible to control the diameter of the aperture of the multiple-stage variable diaphragm 100 in four stages.

Next, a method of driving the multiple-stage variable diaphragm 100 according to the first embodiment will be described below by referring to FIG. 3, FIG. 4, FIG. 5, FIG. 6A, FIG. 6B, and FIG. 6C. First of all, an example of a basic driving in which, only one diaphragm plate 20a is displaced to the aperture position or the retracted position will be described below by referring to FIG. 3 and FIG. 4. Here, FIG. 3 is plan view showing a state of a structure in a basic driving state of the multiple-stage variable diaphragm 100 according to the first embodiment, and FIG. 4 is a graph corresponding to FIG. 3, showing a driving force which acts on the diaphragm plate 20a.

Figure 3:
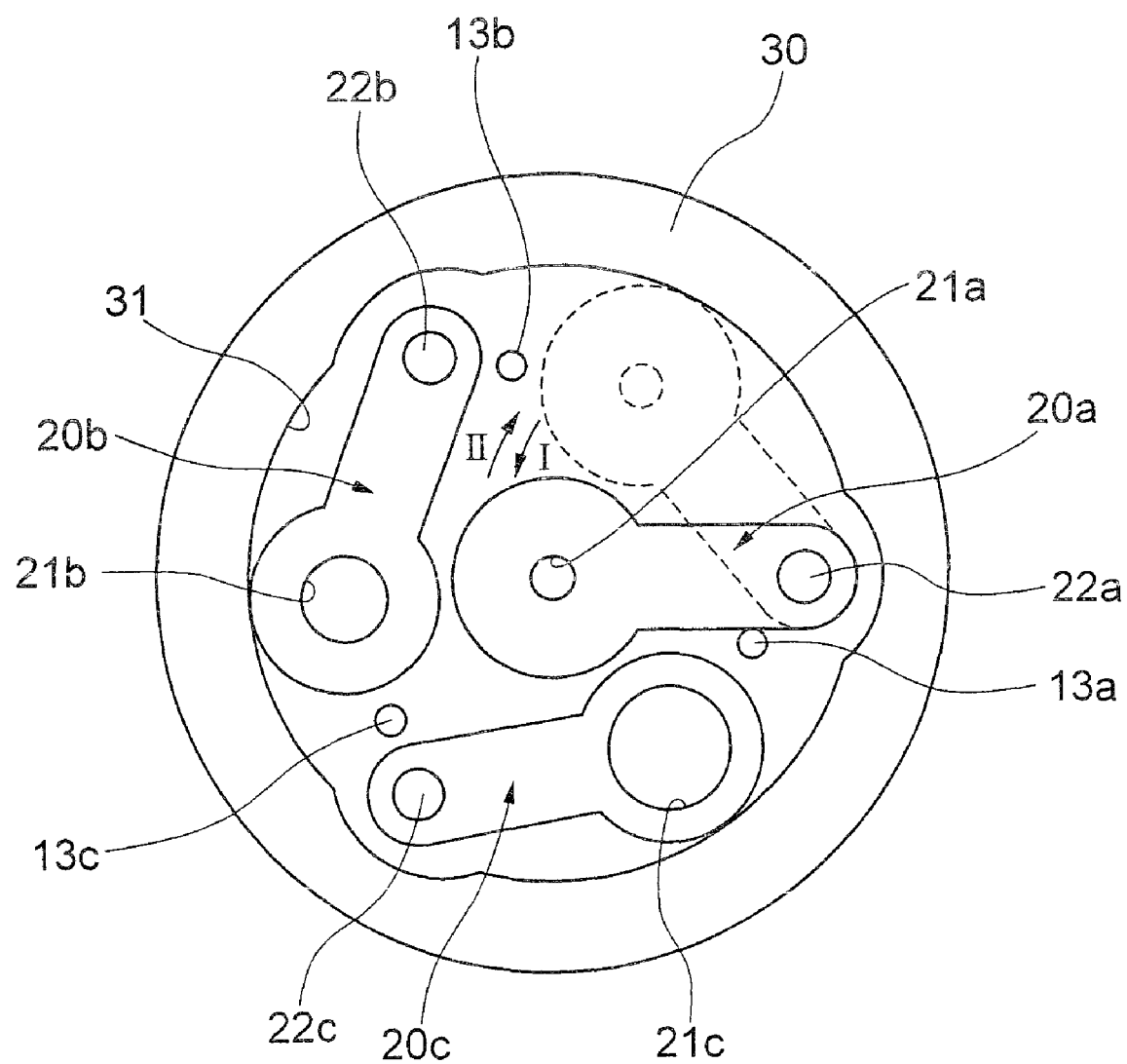
FIG. 3 is a plan view showing a state of a structure in a basic driving state of the multiple-stage variable diaphragm according to the first embodiment.
Figure 4:
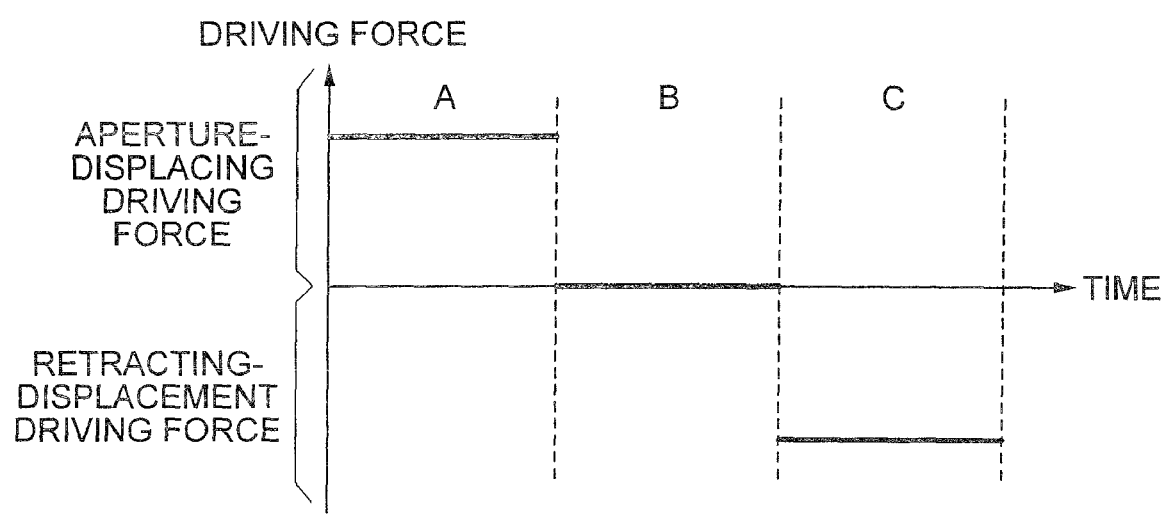
FIG. 4 is a graph showing a driving force which acts on a diaphragm plate according to the first embodiment.

As shown by solid lines in FIG. 3, in a state while the diaphragm plate 20a is tucked at the aperture position upon imparting torque in the counterclockwise direction (direction I) in the diagram to the diaphragm plate 20a, the driving force is shown toward an aperture-displacing driving force as shown in an area A in FIG. 4. Moreover, as shown by broken lines in FIG. 3, in a state in while the diaphragm plate 20a is disposed at the retracted position after being retracted from the aperture position upon imparting torque in the counterclockwise direction (direction II) in the diagram to the diaphragm plate 20a, the driving force is shown toward a retracting-displacement driving force as shown in an area C in FIG. 4. Moreover, in a state while no torque whatsoever is imparted to the diaphragm plate 20a, the driving force is shown by 0 as shown in an area B in FIG. 4.

Figure 5:
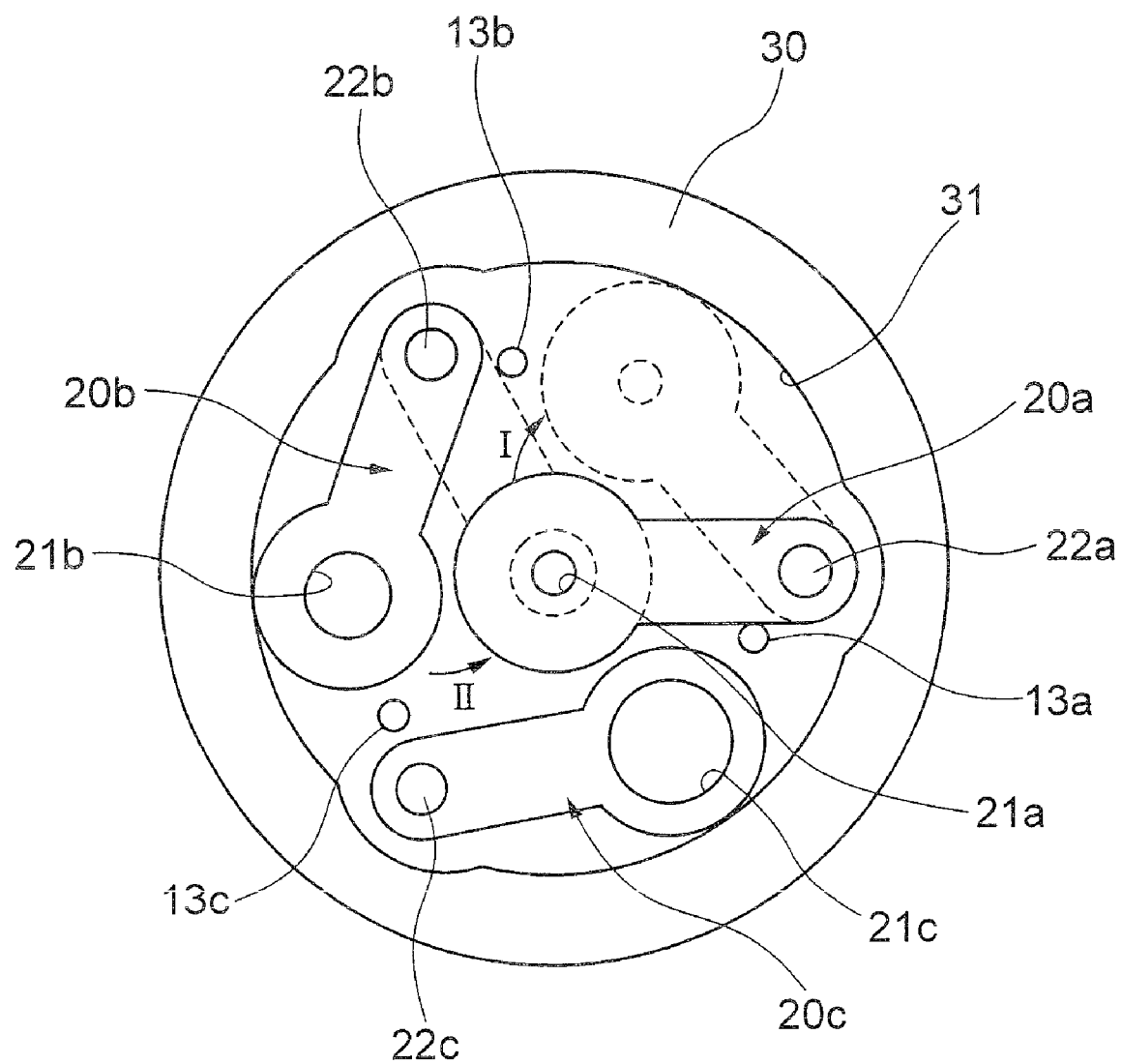
FIG. 5 is a plan view showing a state of a structure of the multiple-stage variable diaphragm during a driving state.
Figure 6A:
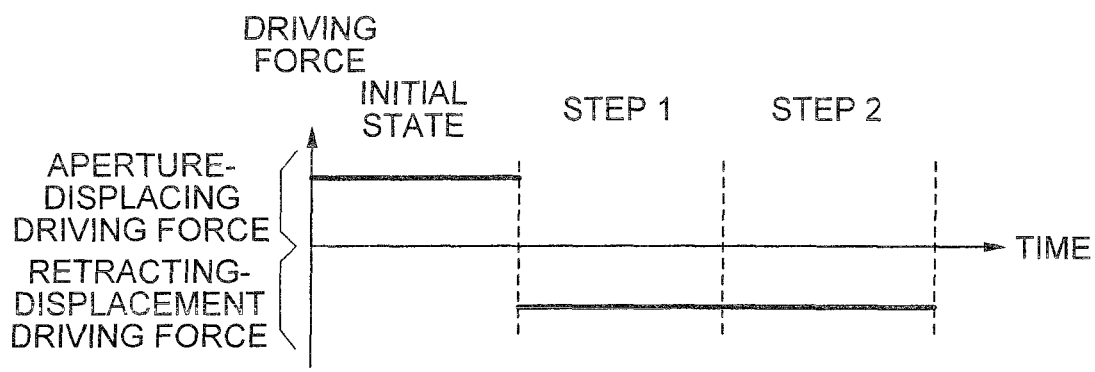
FIG. 6A, FIG. 6B, and FIG. 6C are graphs showing a driving force which acts on a plurality of diaphragm plates respectively.
Figure 6B:
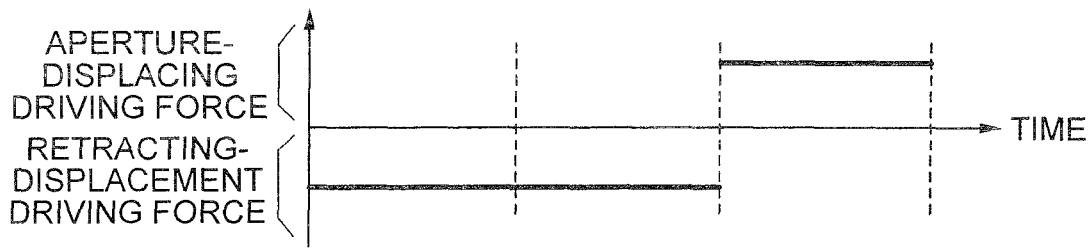
Figure 6C:
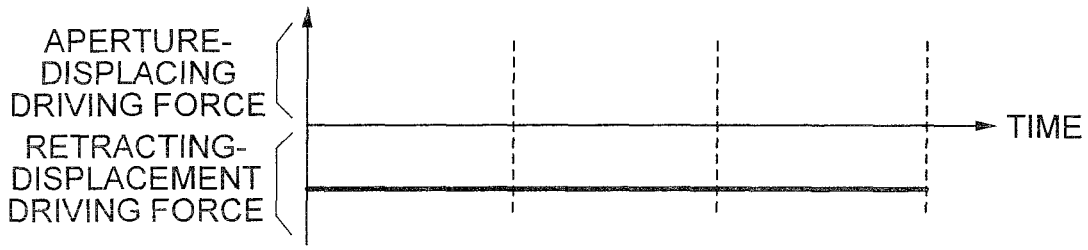

Next, an example of a drive in which the plurality of diaphragm plates is displaced to the aperture position or the retracted position will be described below while referring to FIG. 5, FIG. 6A, FIG. 6B, and FIG. 6C. FIG. 5 is a plan view showing a state of a structure of the multiple-stage variable diaphragm 100 during a driving state. FIG. 6, FIG. 6B, and FIG. 6C, are graphs showing a driving force which acts on the plurality of diaphragm plates 20a, 20b, and 20c. FIG. 6A shows a driving force on the diaphragm plate 20a, FIG. 6B shows a driving force on the diaphragm plate 20b, and FIG. 6C shows a driving force on the diaphragm plate 20c.

As shown by solid lines in FIG. 5, in an initial state, the diaphragm plate 20a is disposed at the aperture position by the aperture-displacing driving force, and the diaphragm plate 20b and the diaphragm plate 20c are disposed at the retracted position by the retracting-displacement driving force. From this state, as shown by broken lines in FIG. 5, for displacing the diaphragm plate 20a to the retracted position and the diaphragm plate 20b to the aperture position, the following steps are to be carried out.

Firstly, the retracting-displacement driving force is exerted to the diaphragm plate 20a, and the diaphragm plate 20a is displaced from the aperture position to the retracted position (direction I in FIG. 5, step 1 in FIG. 6A, FIG. 6B, and FIG. 6C). After step 1 is completed, the aperture-displacing driving force is imparted to the diaphragm plate 20b, and the diaphragm plate 20b is displaced from the retracted position to the aperture position (direction II in FIG. 5, step 2 in FIG. 6A, FIG. 6B, and FIG. 6C). Through the initial state, step 1, and step 2, the retracting-displacement driving force is applied to the diaphragm plate 20c, and the diaphragm plate 20c is disposed at the retracted position.

By driving the diaphragm plates 20a, 20b, and 20c in order of the abovementioned steps 1 and 2, mutual interference of the diaphragm plate 20a and the diaphragm plate 20b during a process of displacement, or inhibiting of the drive of each of the diaphragm plates 20a, 20b, and 20c is prohibited, and it is possible to drive the multiple-stage variable diaphragm 100 more stably.

Figure 7A:
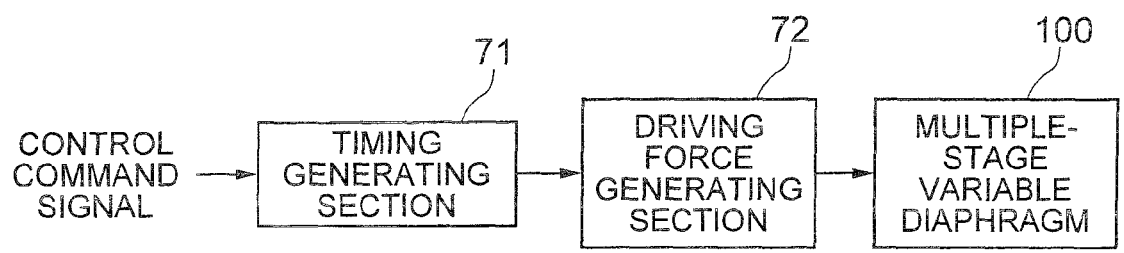
FIG. 7A is a block diagram showing a structure of a control unit of the multiple-stage variable diaphragm according to the first embodiment.
Figure 7B:
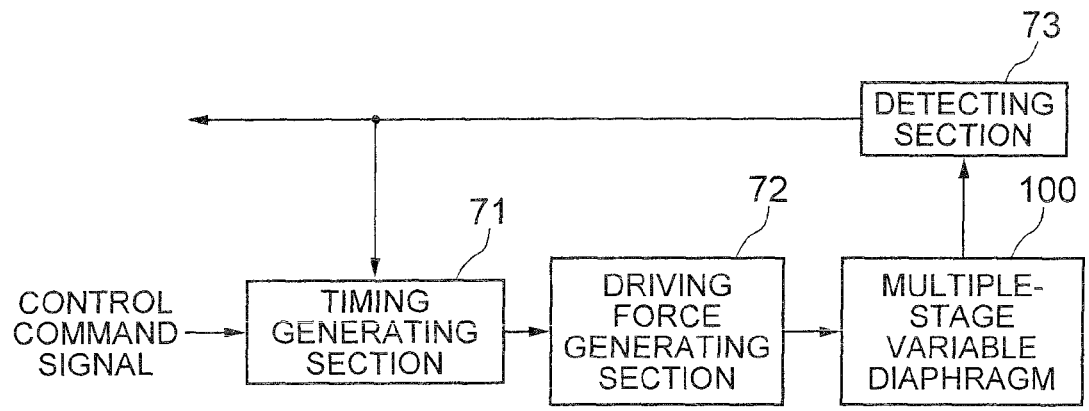
FIG. 7B is a block diagram showing a structure of a control unit according to a modified embodiment.
Figure 8:
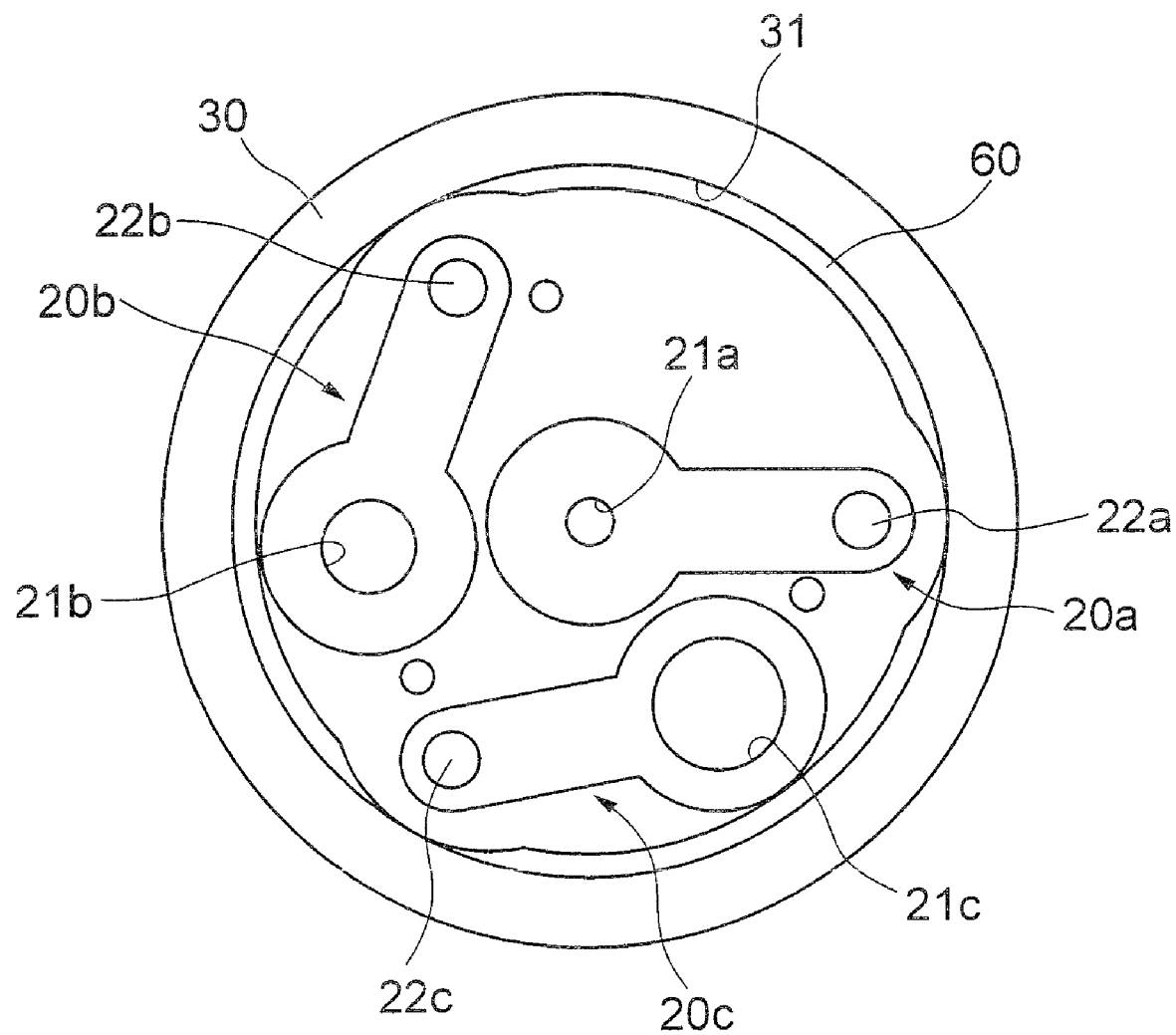
FIG. 8 is a plan view showing a structure of a multiple-stage variable diaphragm according to another modified embodiment.

Next, a control unit of the multiple-stage variable diaphragm 100 according to the first embodiment will be described below by referring to FIG. 7A, FIG. 7B, and FIG. 8. FIG. 7A is a block diagram showing a structure of the control unit of the multiple-stage variable diaphragm according to the first embodiment, and FIG. 7B is a block diagram showing a structure of a control unit according to a modified embodiment. FIG. 8 is a plan view showing a structure of a multiple-stage variable aperture according to another modified embodiment.

As shown in FIG. 7A, the control unit of the multiple-stage variable diaphragm 100 according to the first embodiment includes a timing generating section 71 which generates an operating time and a driving force which operates the diaphragm plates 20a, 20b, and 20c based on a control command signal from a main body (not shown in the diagram), and a drive generating section 72 which generates a driving force which operates the diaphragm plates 20a, 20b, and 20c based on a signal of the timing generating section 71. In the multiple-stage variable diaphragm 100 according to the first embodiment, an electric current to be applied to each of the coils 50a, 50b, and 50c for driving the diaphragm plates 20a, 20b, and 20c by the electromagnetic force is generated in the driving force generating section 72.

A detecting section 73 which detects the state of the diaphragm plates 20a, 20b, and 20c and feeds back a detection result to the timing generating section 71 may be added to the control unit as shown in FIG. 7B. In the detecting section 73, for instance, the state of the diaphragm plates 20a, 20b, and 20c is detected by detecting an amount of light passing through the aperture. Moreover, as the detecting section 73, a detecting sensor 60 such as a pressure sensor or an electrostatic capacitance sensor may be provided to an inner-side surface of the opening portion 31 of the spacer 30 as shown in FIG. 8, and the state of the diaphragm plates 20a, 20b, and 20c abutting the spacer 30 may be detected.

In the a driving unit shown in FIG. 7A, a fixed pattern is stored in a memory (not shown in the diagram) inside the timing generating section 71, and a drive-timing signal of the diaphragm plates 20a, 20b, and 20c is generated based on information of this pattern. Whereas, in a driving unit shown in FIG. 7B, a fixed pattern is stored in the memory inside the timing generating section 71, and furthermore, a drive-timing signal of the diaphragm plates 20a, 20b, and 20c is generated with a signal from the detecting section 73 as a trigger.

In the multiple-stage variable diaphragm 100 according to the first embodiment of the present invention, by displacing the diaphragm plates 20a, 20b, and 20c in a same plane, perpendicular to the optical axis L, the displacement of each of the diaphragm plates 20a, 20b, and 20c to the aperture position is let to be exclusive for the displacement of the other diaphragm plate to the aperture position. In other words, when one diaphragm plate is at the aperture position, the remaining diaphragm plates are displaced to be at the retracted position. Whereas, when the diaphragm plates 20a, 20b, and 20c are formed to be displaced in different planes, perpendicular to the optical axis L, by providing a protrusion etc. to the light shielding portions 23a, 23b, and 23c of the diaphragm plates 20a, 20b, and 20c, it is possible to let the displacement of each of the diaphragm plates 20a, 20b, and 20c to the aperture position to be exclusive for the displacement of the other diaphragm plates to the aperture position.

Moreover, by replacing the diaphragm plates 20a, 20b, and 20c according to the first embodiment by a plurality of optical lenses respectively, it is possible to use also as an optical lens attaching and detaching unit. Furthermore, by replacing the diaphragm plates 20a, 20b, and 20c according to the first embodiment by a plurality of optical filters respectively, it is possible to use also as an optical filter attaching and detaching unit which changes an amount of light transmitted or a transmission wavelength region. Moreover, in the multiple-stage variable diaphragm 100 according to the first embodiment, the description has been made by citing an example of an electromagnetic type, with a magnet and a coil as a drive source. However, it is also possible to use other types such as a type in which an artificial muscle is used or a method in which a shape memory alloy is used.

Second Embodiment

Figure 9:
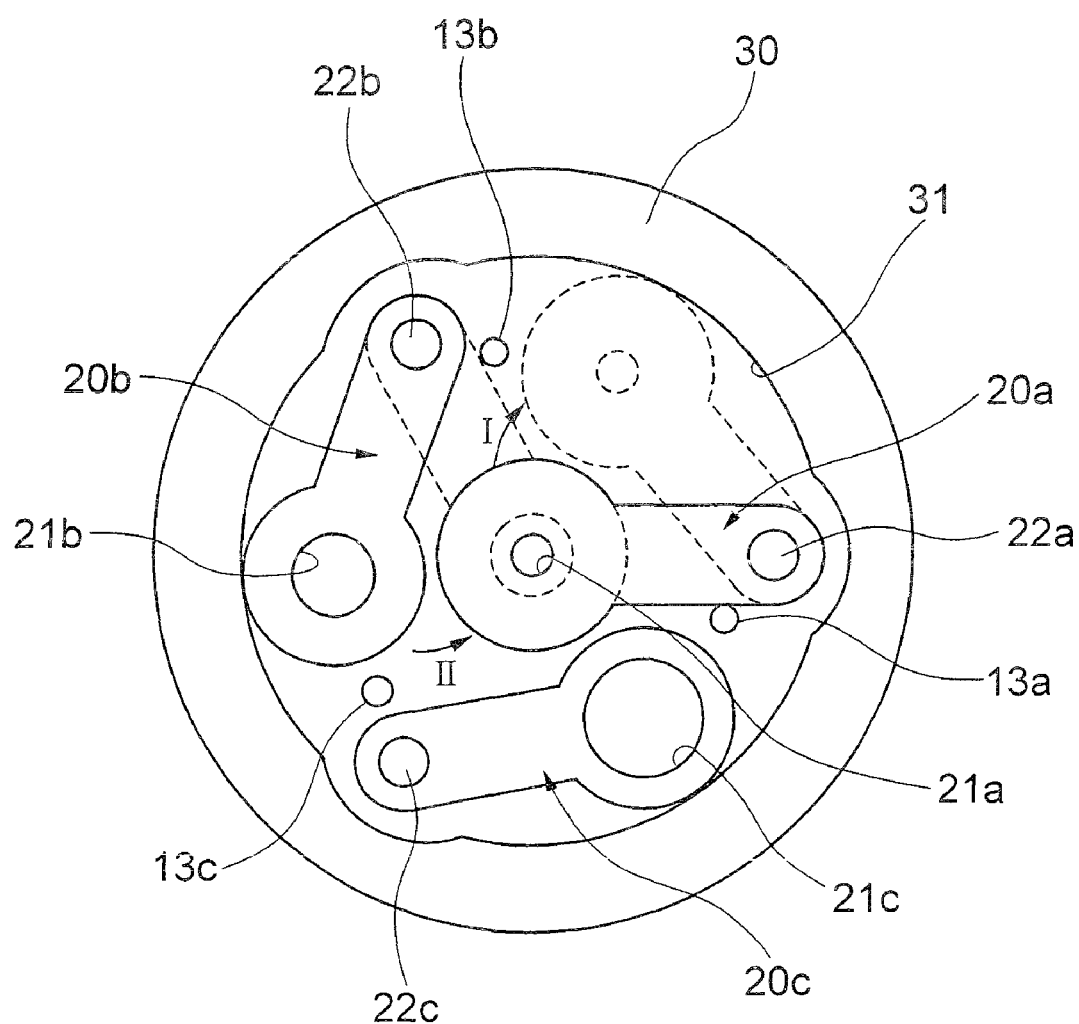
FIG. 9 is a plan view showing a state of a structure of a multiple-stage variable diaphragm during a driving state, in a method of driving a multiple-stage variable diaphragm according to a second embodiment.
Figure 10A:
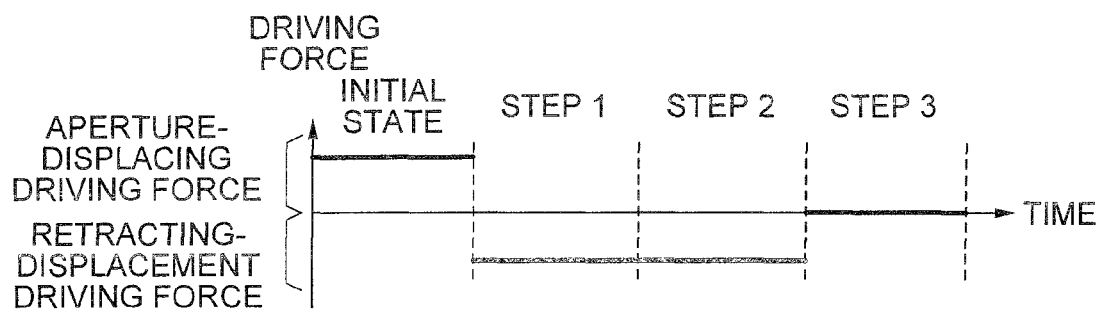
FIG. 10A, FIG. 10B, and FIG. 10C are graphs showing a driving force which acts on a plurality of diaphragm plates respectively, in the method of driving multiple-stage variable diaphragm according to the second embodiment of the present invention.
Figure 10B:
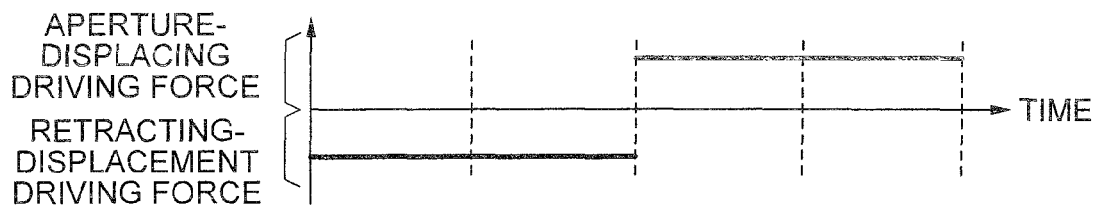
Figure 10C:
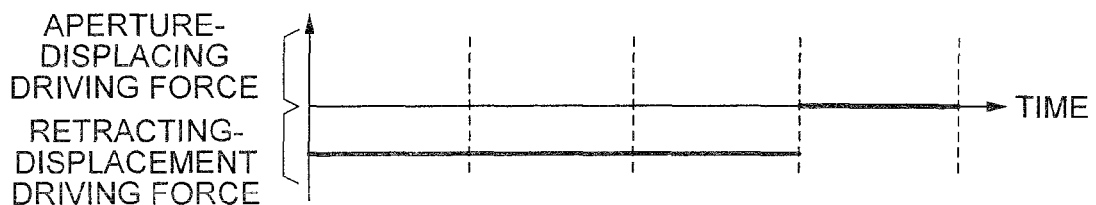

Next, a method of driving a multiple-stage variable diaphragm according to a second embodiment will be described below while referring to FIG. 9, FIG. 10A, FIG. 10B, and FIG. 10C. FIG. 9 is a plan view showing a state of a structure of the multiple-stage variable diaphragm during a driving state. FIG. 10A, FIG. 10B, and FIG. 10C are graphs showing a driving force which acts on the plurality of diaphragm plates 20a, 20b, and 20c respectively, where, FIG. 10A shows the driving force to the diaphragm plate 20a, FIG. 10B shows the driving force to the diaphragm plate 20b, and FIG. 10C shows the driving force to the diaphragm plate 20c. A structure of the multiple-stage variable diaphragm according to the second embodiment being similar to the structure of the multiple-stage variable diaphragm 100 according to the first embodiment, the description in detail thereof is omitted.

As shown by solid lines in FIG. 9, in an initial state, the diaphragm plate 20a is disposed at the aperture position by the aperture-displacing driving force, and the diaphragm plate 20b and the diaphragm plate 20c are disposed at the retracted position by the retracting-displacement driving force. For displacing the diaphragm plate 20a from this state to the retracted position and the diaphragm plate 20b to the aperture position as shown by broken lines in FIG. 9, the following steps are to be carried out.

Firstly, the retracting-displacement driving force is imparted to the diaphragm plate 20a, and the diaphragm plate 20a is displaced from the aperture position to the retracted position (direction I in FIG. 9, step 1 in FIG. 10A, FIG. 10B, and FIG. 10C). After step 1 is completed, the aperture-displacing driving force is imparted to the diaphragm plate 20b, and the diaphragm plate 20b is displaced from the retracted position to the aperture position (direction II in FIG. 9, step 2 in FIG. 10A, FIG. 10B, and FIG. 10C). Further, after step 2 is completed, the retracting-displacement driving force of the diaphragm plate 20a and the diaphragm plate 20c disposed at the retracted position is let to be 0 (step 3).

Step 1 and step 2 of the method of driving according to the second embodiment are similar to step 1 and step 2 of method of driving according to the first embodiment. However, in the method of driving according to the second embodiment, an additional step 3 is carried out. By carrying out step 3, when the driving force of the diaphragm plates 20a and 20c disposed at the retracted position is let to be 0, since no driving force whatsoever is exerted to the diaphragm plate 20a and the diaphragm plate 20c disposed at the retracted position, the disposed state is not steady due to a gravitational force, an impact from an outside, and a generation of an acceleration. However, since the diaphragm plate 20b is disposed in an aperture area and since the aperture-displacing driving force is acting, a movable area is regulated by the diaphragm plate 20a and the diaphragm plate 20c being abut to the diaphragm plate 20b. By letting the retracting-displacement driving force of the diaphragm plates 20a and 20c disposed at the retracted position in such manner to be 0, it is possible to reduce electric power consumption without imparting an effect on a disposed state of the diaphragm plates.

Rest of the structure, action, and effect are similar as in the first embodiment.

Third Embodiment

Figure 11:
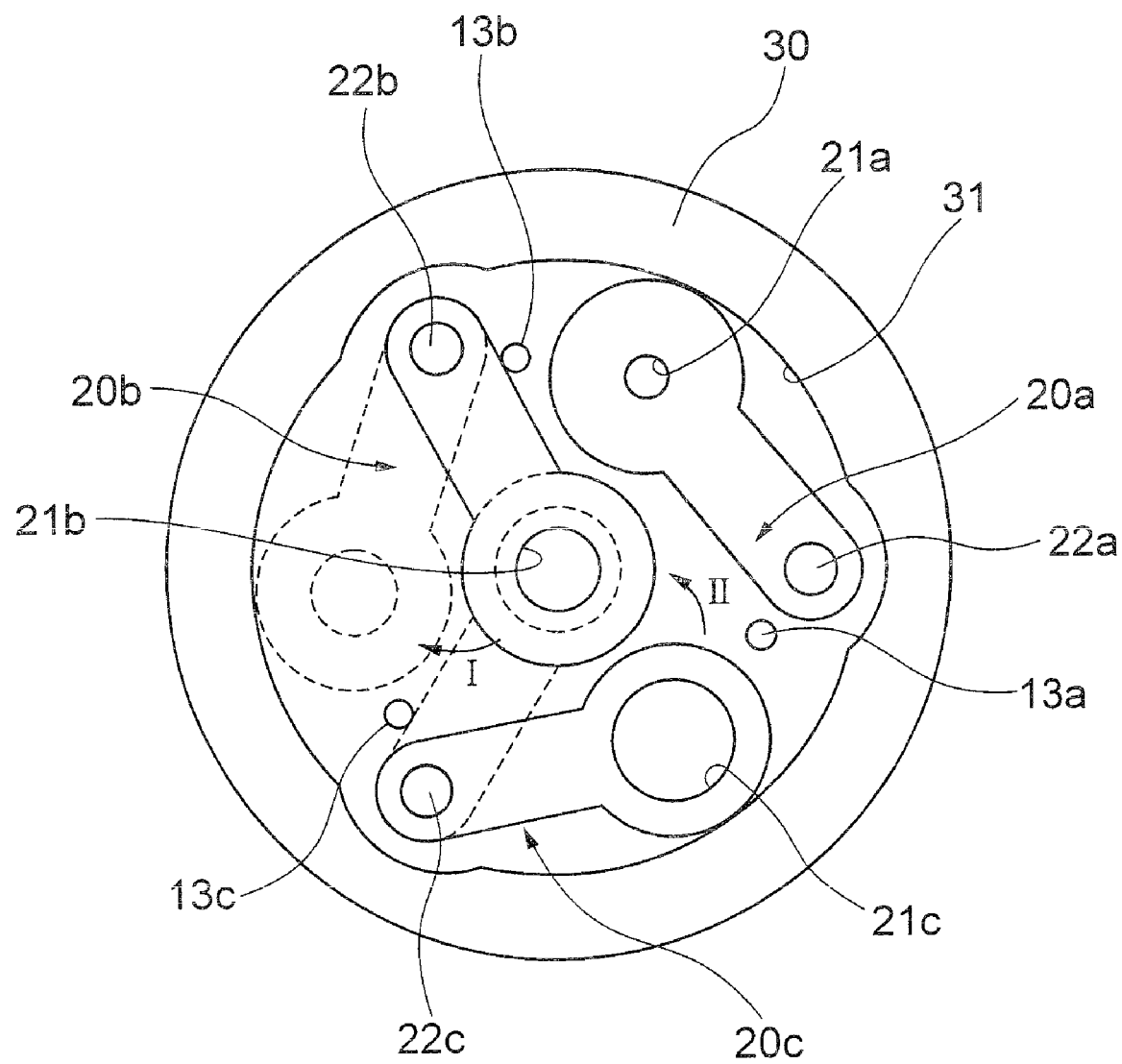
FIG. 11 is a plan view showing a state of a structure of a multiple-stage variable diaphragm during a driving state, in a method of driving a multiple-stage variable diaphragm according to a third embodiment.
Figure 12A:
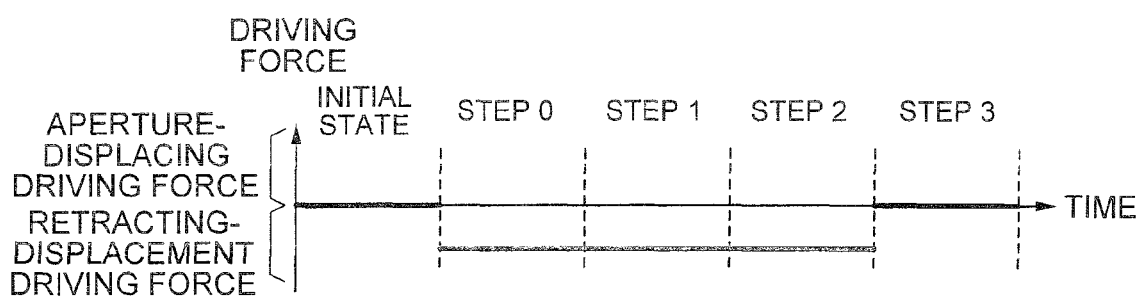
FIG. 12A, FIG. 12B, and FIG. 12C are graphs showing a driving force which acts on a plurality of diaphragm plates respectively, in a method of driving multiple-stage variable diaphragm according to the third embodiment of the present invention.
Figure 12B:
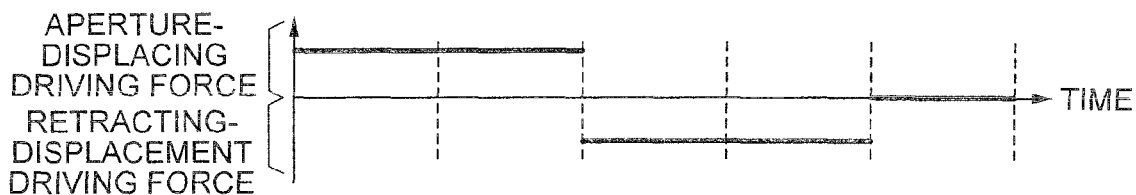
Figure 12C:
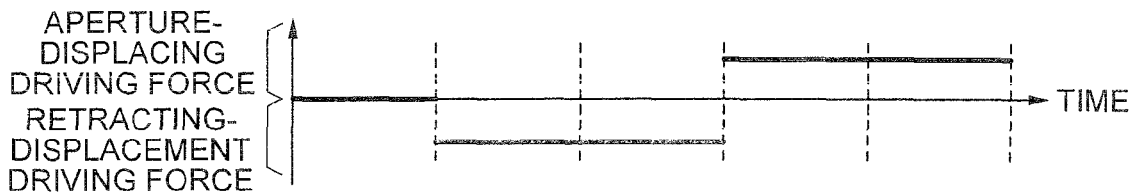

Next, a method of driving a multiple-stage variable diaphragm according to a third embodiment will be described below by referring to FIG. 11, FIG. 12A, FIG. 12B, and FIG. 12C. FIG. 11 is a plan view showing a state of a structure of the multiple-stage variable diaphragm 100 during a driving state. FIG. 12A, FIG. 12B, and FIG. 12C are graphs showing a driving force which acts on the plurality of diaphragm plates 20a, 20b, and 20c respectively, where, FIG. 12A shows the driving force to the diaphragm plate 20a, FIG. 12B shows the driving force to the diaphragm plate 20b, and FIG. 12C shows the driving force to the diaphragm plate 20c. A structure of the multiple-stage variable diaphragm according to the third embodiment being similar to the structure of the multiple-stage variable diaphragm 100 according to the first embodiment, the description in detail thereof is omitted.

As shown by solid lines in FIG. 11, in an initial state, the diaphragm plate 20b is disposed at the aperture position by the aperture-displacing driving force, and the diaphragm plate 20a and the diaphragm plate 20c are disposed at the retracted position. For displacing the diaphragm plate 20b from this state to the retracted position, and the diaphragm plate 20c to the aperture position as shown by broken lines in FIG. 11, the following steps are to be carried out.

Firstly, the retracting-displacement driving force is imparted to the diaphragm plate 20a and the diaphragm plate 20c disposed at the retracted position, and diaphragm plate 20a and the diaphragm plate 20c are maintained at the retracted position (step 0). Next, after step 0 is completed, the retracting-displacement driving force is applied to the diaphragm plate 20b, and the diaphragm plate 20b is displaced from the aperture position to the retracted position (direction I in FIG. 11, step 1 in FIG. 12A, FIG. 12B, and FIG. 12C). After step 1 is completed, the aperture-displacing driving force is applied to the diaphragm plate 20c, and the diaphragm plate 20c is displaced from the retracted position to the aperture position (direction II in FIG. 11, and step 2 in FIG. 12A, FIG. 12B, and FIG. 12C). Finally, after step 2 is completed, the retracting-displacement driving force of the diaphragm plate 20a and the diaphragm plate 20b disposed at the retracted position is let to be 0 (step 3).

Steps from step 1 to step 3 of the method of driving according to the third embodiment are similar to steps from step 1 to step 3 of the method of driving according to the second embodiment. However, in the method of driving according to the third embodiment, step 0 is carried out before step 1. By carrying out step 0, by exerting the retracting-displacement driving force to the diaphragm plate 20a and the diaphragm plate 20b disposed at the retracted position, and maintaining the diaphragm plate 20a and the diaphragm plate 20b at the retracted position before driving the diaphragm plate 20c, it is possible to prevent interference with the diaphragm plate which is displaced from the aperture position to the retracted position.

Rest of the structure, action, and effect are similar as in the first embodiment.

Fourth Embodiment

Figure 13:
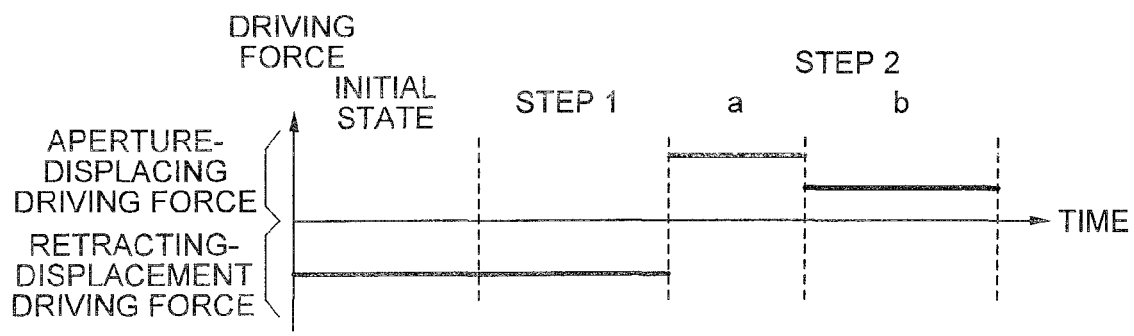
FIG. 13 is a graph showing a driving force which acts on a diaphragm plate of a multiple-stage variable diaphragm according to a fourth embodiment, for displacing the diaphragm plate from a retracted position to a position of an aperture.

Next, a method of driving of a multiple-stage variable diaphragm according to a fourth embodiment will be described below by referring to FIG. 13. FIG. 13 is a graph showing a driving force which acts on the diaphragm plate 20a of the multiple-stage variable diaphragm according to the fourth embodiment, for displacing the diaphragm plate 20a from the retracted position to the aperture position. A structure of the multiple-stage variable diaphragm according to the fourth embodiment being similar to the structure of the multiple-stage variable diaphragm 100 according to the first embodiment, the description in detail thereof is omitted. Here, a case in which the diaphragm plate 20a is displaced is described below, and a case of displacing the diaphragm plate 20b or the diaphragm plate 20c is the similar to the case described below.

In the method of driving the multiple-stage variable diaphragm according to the fourth embodiment, as shown in FIG. 13, after a strong driving force is exerted once as the aperture-displacing driving force which is exerted to the diaphragm plate 20a to be displaced from the retracted position to the aperture position (step 2a), a driving force weaker than the driving force in step 2a is exerted (step 2b). By such driving method, it is possible to exert a strong driving force (operating driving force) which is necessary in a case of displacing the diaphragm plate 20a in a stationary state, as well as to exert a sufficient driving force (maintaining driving force) which is necessary in a case of holding the diaphragm plate 20a at that position after being displaced. In other words, the driving force of step 2a is optimized by a force necessary for displacing the diaphragm plate 20a from the retracted position to the aperture position, and an operating time is optimized by a time for displacement of the diaphragm plate 20a from the aperture position to the retracted position. Moreover, the driving force of step 2b is optimized by the gravitational force, the impact from outside, and the acceleration etc. which is supposed to be acting on the diaphragm plate 20a. In this manner, by reducing the aperture-displacing driving force according to the requirement, it is possible to reduce electric power consumption.

Whereas, in a case of displacing all the diaphragm plates 20a, 20b, and 20c to the retracted position, after a strong driving force is exerted once as the retracting-displacement driving force which is exerted to the diaphragm plates 20a, 20b, and 20c, by exerting a low driving force, it is possible to achieve a similar effect.

Fifth Embodiment

Figure 14:
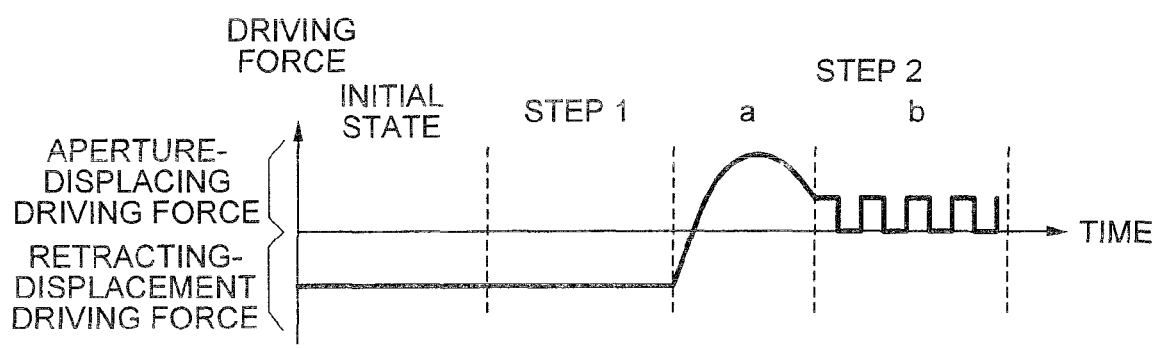
FIG. 14 is a graph showing a driving force which acts on a diaphragm plate of a multiple-stage variable diaphragm according to a fifth embodiment, for displacing the diaphragm plate from the retracted position to the aperture position.

A method of driving multiple-stage variable diaphragm according to a fifth embodiment will be described below while referring to FIG. 14. FIG. 14 is a graph showing a driving force which acts on a diaphragm plate 20a of the multiple-stage variable diaphragm according to the fifth embodiment, for displacing the diaphragm plate 20a from the retracted position to the aperture position. A structure of the multiple-stage variable diaphragm according to the fifth embodiment being similar to the structure of the multiple-stage variable diaphragm 100 according to the first embodiment, the description in detail thereof is omitted. Moreover, here, a case in which the diaphragm plate 20a is displaced is described below, and a case of displacing the diaphragm plate 20b or the diaphragm plate 20c is similar to the case described below.

In the method of driving multiple-stage variable diaphragm according to the fifth embodiment, as shown in FIG. 14, a driving force in the form of a sinusoidal wave is exerted as the aperture-displacing driving force which is exerted to the diaphragm plate 20a to be displaced from the retracted position to the aperture position (step 2a). Moreover, a driving force is exerted intermittently as the aperture-displacing driving force which maintains a state of the diaphragm plate 20a after step 2a (step 2b).

When the multiple-stage variable diaphragm is driven in such manner, in a case of displacing the diaphragm plate 20a, it is possible to prevent a phenomenon such as bound which is generated after the diaphragm plate 20a has abut to the positioning protrusion 13a when a driving force stronger than necessary is exerted. Consequently, as shown in step 2a of FIG. 14, by letting the aperture-displacing driving force to be exerted to the diaphragm plate 20a to be in the form of a sign wave, it is possible to decrease the driving force before the diaphragm plate 20a abuts to the positioning protrusion 13a, and to prevent the phenomenon such as bound. In other words, a time-integration amount of the driving force at step 2a is optimized by a force necessary for displacing the diaphragm plate 20a from the aperture position to the retracted position, and the operating time at step 2a is optimized by a time for displacement of the diaphragm plate 20a from the aperture position to the retracted position. In the fifth embodiment, although the aperture-displacing driving force to be exerted to the diaphragm plate 20a is let to be in the form of a sine wave, the aperture-displacing driving force may be let to be in the form of a triangular wave or in the saw tooth form, provided that the similar effect is achieved. Moreover, it is possible to reduce the electric power consumption by exerting the aperture-displacing driving force intermittently, to an extent that there is no effect on a holding operation. This is highly effective when a system in which an electric current flows steadily is used as a driving system. Similarly, in a case of displacing the diaphragm plate 20a to the retracted position, it is possible to achieve a similar effect by exerting the driving force intermittently, as the retracting-displacement driving force which holds the state of the diaphragm plate 20a.

Sixth Embodiment

Next, a method of driving a multiple-stage variable diaphragm according to a sixth embodiment will be described below. In the method of driving the multiple-stage variable diaphragm according to the sixth embodiment, the retracting-displacement driving force is exerted to all the diaphragm plates 20a, 20b, and 20c at the time of putting ON a power supply of the apparatus, and the diaphragm plates 20a, 20b, and 20c are displaced to the retracted position. Accordingly, since it is possible to displace in a direction in which there is no interference between the diaphragm plates 20, in other words, to displace to the retracted position, at the time of putting ON power supply when the disposed state of the diaphragm plates 20a, 20b, and 20c is unstable, even more stable operation is possible.

As it has been described above, the method of driving the light controlling apparatus according to the present invention is useful for a small-size image pickup equipment which includes a plurality of optical elements.

According to a light controlling apparatus, a control unit of light controlling apparatus, and a method of driving light controlling apparatus according to the present invention, there is shown an effect that it is possible to prevent an operation of the light controlling apparatus from becoming unstable due to an effect and interference of the plurality of optical elements.

What is claimed is:

1. A method of driving light controlling apparatus which includes a substrate, which has an aperture, a plurality of incident-light controlling units, each having an aperture of different diameter formed thereon, which are displaced on the substrate, a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position, the incident-light controlling unit is displaced by the driving unit to the aperture position and the retracted position alternately, and incident light passing through the aperture is adjusted, and when one incident-light controlling unit is at the aperture position, the remaining incident-light controlling units are displaced to the retracted position, each of the plurality of incident-light controlling units having a non-coincident axis of rotation, comprising:

a step of displacing the incident-light controlling unit, which includes a step of displacing a first incident-light controlling unit disposed at the aperture position, to the retracted position, and a step of displacing a second incident-light controlling unit disposed at the retracted position, to the aperture position, after completion of the step of displacing the first incident-light controlling unit to the retracted position.

2. The method of driving light controlling apparatus according to claim 1, further comprising: a step of releasing the retracting-displacement driving force of the driving units corresponding to all the incident-light controlling unit disposed at the retracted position, after completion of the step of displacing the second incident-light controlling unit disposed at the retracted position, to the aperture position.

3. The method of driving light controlling apparatus according to claim 2, further comprising: a step of exerting the retracting-displacement driving force of the driving units corresponding to all incident-light controlling unit disposed at the retracted position, prior to the step of displacing the first incident-light controlling unit disposed at the aperture position, to the retracted position.

4. The method of driving light controlling apparatus according to claim 3, further comprising: a step of reducing the aperture-displacing driving force of the driving unit corresponding to the incident-light controlling unit disposed at the aperture position after the step of displacing the second incident-light controlling unit disposed at the retracted position, to the aperture position.

5. The method of driving light controlling apparatus according to claim 4, wherein the aperture-displacing driving force and the retracting-displacement driving force include an operating driving force which displaces the position of the incident-light controlling unit and a maintaining driving force which maintains the position of the incident-light controlling unit, and the operating driving force is stronger than the maintaining driving force.

6. The method of driving light controlling apparatus according to claim 5, wherein at the time of putting ON a power supply of the light controlling apparatus, all the incident-light controlling unit are displaced to the retracted position.

7. The method of driving light controlling apparatus according to claim 6, wherein the plurality of incident-light controlling unit are displaced in a same plane.

8. The method of driving light controlling apparatus according to claim 7, wherein the operating driving force is in a form of a sinusoidal wave.

9. A control unit of light controlling apparatus, which drives a light controlling apparatus according to claim 8, generates the aperture-displacing driving force and the retracting-displacement driving force, and exerts the aperture-displacing driving force and the retracting-displacement driving force to the incident-light controlling unit.

10. The method of driving light controlling apparatus according to claim 7, wherein the maintaining driving force is exerted intermittently to the incident-light controlling unit.

11. A control unit of light controlling apparatus which drives a light controlling apparatus according to claim 10, generates the aperture-displacing driving force and the retracting-displacement driving force, and exerts the aperture-displacing driving force and the retracting-displacement driving force to the incident-light controlling unit.

12. The method of driving light controlling apparatus according to claim 6, wherein
    each of the plurality of incident-light controlling unit is displaced in a different plane, and
    a regulating member which regulates the displacement of the other incident-light controlling unit to the aperture position is formed in each incident-light controlling unit.

13. The method of driving light controlling apparatus according to claim 12, wherein the operating driving force is in a form of a sinusoidal wave.

14. A control unit of light controlling apparatus which drives a light controlling apparatus according to claim 13, generates the aperture-displacing driving force and the retracting-displacement driving force, and exerts the aperture-displacing driving force and the retracting-displacement driving force to the incident-light controlling unit.

15. The method of driving the light controlling apparatus according to claim 12, wherein the maintaining driving force is exerted intermittently to the incident-light controlling unit.

16. A control unit of light controlling apparatus which drives a light controlling apparatus according to claim 15, generates the aperture-displacing driving force and the retracting-displacement driving force, and exerts the aperture-displacing driving force and the retracting-displacement driving force to the incident-light controlling unit.

17. A light controlling apparatus comprising:
    a substrate, which has an aperture;
    a plurality of incident-light controlling unit which are displaced on the substrate, each of the plurality of incident-light controlling unit having a non-coincident axis of rotation;
    a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position; and a detecting section which detects a state of the incident-light controlling unit, wherein based on a result of detection by the detecting section, the incident-light controlling unit is displaced by the driving unit to the aperture position and the retracted position alternately, and incident light passing through the aperture is adjusted, and the displacement of each incident-light controlling unit to the aperture position is exclusive for the other incident-light controlling unit.

18. The light controlling apparatus according to claim 17, wherein an aperture of different diameter is formed in each incident-light controlling unit.

19. The light controlling apparatus according to claim 17, wherein a different optical lens is formed for each incident-light controlling unit.

20. The light controlling apparatus according to claim 17, wherein a different optical filter is formed for each incident-light controlling unit.

21. A method of driving light controlling apparatus which includes a substrate, having an aperture, a plurality of incident-light controlling units, each having a different optical lens formed thereon, which are displaced on the substrate, a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position, the incident-light controlling unit being displaced by the driving unit to the aperture position and the retracted position alternately, and incident light passing through the aperture is adjusted, and when one incident-light controlling unit is at the aperture position, the remaining incident-light controlling units are displaced to the retracted position, each of the plurality of incident-light controlling units having a non-coincident axis of rotation, comprising:

a step of displacing the incident-light controlling unit, which includes a step of displacing a first incident-light controlling unit disposed at the aperture position, to the retracted position, and a step of displacing a second incident-light controlling unit disposed at the retracted position, to the aperture position, after completion of the step of displacing the first incident-light controlling unit to the retracted position.

22. A method of driving light controlling apparatus which includes a substrate, having an aperture, a plurality of incident-light controlling units, each having a different optical filter formed thereon, which are displaced on the substrate, a plurality of driving unit which exert on the incident-light controlling unit, an aperture-displacing driving force which displaces the incident-light controlling unit to an aperture position, and a retracting-displacement driving force which displaces the incident-light controlling unit to a retracted position which is different from the aperture position, the incident-light controlling unit being displaced by the driving unit to the aperture position and the retracted position alternately, and incident light passing through the aperture is adjusted, and when one incident-light controlling unit is at the aperture position, the remaining incident-light controlling units are displaced to the retracted position, each of the plurality of incident-light controlling units having a non-coincident axis of rotation, comprising:

a step of displacing the incident-light controlling unit, which includes a step of displacing a first incident-light controlling unit disposed at the aperture position, to the retracted position, and a step of displacing a second incident-light controlling unit disposed at the retracted position, to the aperture position, after completion of the step of displacing the first incident-light controlling unit to the retracted position.

* * * * *